United States Patent
Sloan

(10) Patent No.: US 8,462,157 B2
(45) Date of Patent: Jun. 11, 2013

(54) COMPUTING THE IRRADIANCE FROM A DISK LIGHT SOURCE AT A RECEIVER POINT

(75) Inventor: Peter-Pike Sloan, Cottonwood Heights, UT (US)

(73) Assignee: Disney Enterprises, Inc., Burbank, CA (US)

( * ) Notice: Subject to any disclaimer, the term of this patent is extended or adjusted under 35 U.S.C. 154(b) by 508 days.

(21) Appl. No.: 12/756,842

(22) Filed: Apr. 8, 2010

(65) Prior Publication Data

US 2011/0249012 A1 Oct. 13, 2011

(51) Int. Cl.
*G06T 15/50* (2011.01)

(52) U.S. Cl.
USPC .......................................................... 345/426

(58) Field of Classification Search
None
See application file for complete search history.

(56) References Cited

U.S. PATENT DOCUMENTS

| 6,567,083 | B1 * | 5/2003 | Baum et al. | 345/426 |
| 7,663,623 | B2 * | 2/2010 | Zhou et al. | 345/426 |
| 2005/0083340 | A1 * | 4/2005 | Sloan et al. | 345/582 |
| 2009/0309877 | A1 * | 12/2009 | Snyder et al. | 345/426 |

OTHER PUBLICATIONS

Kun Zhou , Yaohua Hu , Stephen Lin , Baining Guo , Heung-Yeung Shum, Precomputed shadow fields for dynamic scenes, ACM Transactions on Graphics (TOG), v.24 n. 3, Jul. 2005.*

* cited by examiner

*Primary Examiner* — Daniel Hajnik
(74) *Attorney, Agent, or Firm* — Patterson & Sheridan LLP

(57) ABSTRACT

Techniques are disclosed to determine the irradiance from a disk light source with much higher accuracy than may be obtained using the common approximation often used currently. By pre-computing, SH coefficients using a specific coordinate frame, only six SH coefficients need to be stored in a first and second texture, one used to determine irradiance of a point within the radius of a disk light source and another for more distant points.

18 Claims, 6 Drawing Sheets

COMPUTING THE IRRADIANCE FROM A DISK LIGHT SOURCE AT A RECEIVER POINT

BACKGROUND

1. Field of the Invention

The present invention relates to the field of computer graphics and, in particular, to techniques for lighting objects in a computer-generated graphics scene.

2. Description of the Related Art

It is common for video games to pre-compute the static or diffuse lighting for three-dimensional (3D) scene geometry. The pre-computed lighting data is then used to light elements of the scene geometry at runtime (i.e., when the video game is played). This approach separates the lighting used for static elements of the scene from the lighting of dynamic elements, such as characters.

One common type of light source is used to light dynamic elements of scene geometry is a disk light source. And disk light sources have been used in interactive rendering. However, one commonly used approximation for the irradiance of a receiver point lit by a disk light source turns out to have a high error when the point is near the light source. This common approximation is given by:

$$\frac{\cos(\theta)\cos(\alpha)r^2}{r^2 + d^2}$$

where r is the radius of the disk, d is the distance from the center of the disk light source to the receiver point, the angle $\theta$ is measured between the normal of the disk light source and the vector from the center of the disk to the receiver point, and an angle alpha $\alpha$ is measured between the vector from the center of the disk to the receiver point and the normal of the receiver point. The common approximation yields a value of zero (i.e., of no irradiance) whenever the angle between the normal of the receiver point and the vector to the center of the disk is ninety degrees, regardless of the distance from the disk light source, which is clearly incorrect.

A more accurate approach for determining the irradiance of a receiver point at a disk light source would be to analytically compute the irradiance for the light source for any given receiver point, based on the normal at that receiver point. However, doing so would require the use of a four or five dimensional lookup table at runtime, which is impractical for current systems.

SUMMARY

Embodiments of the invention provide a technique for computing the irradiance at a receiver point from a disk light source. One embodiment of the invention includes a computer-implemented method for generating pre-computed lighting data used to compute a lighting irradiance from a disk light source at a receiver point. The method may generally include generating a first table for a plurality of points within a radius of the disk light source, where one or more entries in the first table store a set of spherical harmonics (SH) coefficients. The method may also include generating a second table for a plurality of points outside of the radius of the disk light source, where one or more entries in the second table store a set of SH coefficients.

In a particular embodiment, the method also includes storing the first table in a first texture parameterized by (i) a cosine of an angle ($\theta$) measured between a normal of the disk light source and by a vector (D) from the center of the disk light source to a given one of the first plurality of points and (ii) a distance d measured from the center of the disk light source to the given one of the first plurality of points; and also includes storing the second table in a second texture parameterized by (i) a cosine of an angle ($\theta$) measured between the normal of the disk light source and by a vector (D) from the center of the disk light source to a given one of the second plurality of points and (ii) a ratio of 1 to a distance d measured from the center of the disk light source to the given of the second plurality of points.

Another embodiment of the invention includes a non-transitory computer-readable storage medium storing instructions that, when executed by a processor, cause a computer system to perform an operation for generating pre-computed lighting data used to compute a lighting irradiance from a disk light source at a receiver point. The operation may generally include generating a first table for a plurality of points within a radius of the disk light source, wherein one or more entries in the first table stores a set of spherical harmonics (SH) coefficients and generating a second table for a plurality of points outside of the radius of the disk light source, wherein one or more entries in the second table stores a set of SH coefficients.

Another embodiment of the invention includes a system having a processor and a memory configured to perform an operation for generating pre-computed lighting data used to compute a lighting irradiance from a disk light source at a receiver point. The operation may include generating a first table for a plurality of points within a radius of the disk light source. Each of the entries in the first table stores a set of spherical harmonics (SH) coefficients. The operation may also include generating a second table for a plurality of points outside of the radius of the disk light source. Each of the entries in the second table stores a set of SH coefficients.

Still another embodiment of the invention includes a method for determining a lighting irradiance from a disk light source at a receiver point. The method may generally include receiving an indication of a location of the receiver point, and determining a distance (d) from the receiver point to a center of the disk light source. Upon determining the distance d is less than a radius (r) of the disk light source, a first texture is sampled to retrieve a first set of SH coefficients. Each texel in the first texture stores a set of spherical harmonics (SH) coefficients for one of a first plurality of points located within the radius of the disk light source. Otherwise, upon determining the distance d is greater than the radius (r) of the disk light source, a second texture is sampled to retrieve a corresponding set of SH coefficients, wherein each texel in the second texture stores a set of spherical harmonics (SH) coefficients corresponding to one of a plurality of points located outside of the radius of the disk light source. This method may also include translating a normal at the receiver point into the coordinate frame of reference and computing the lighting irradiance at the receiver point from the sampled set of SH coefficients and the translated normal.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for lighting dynamic elements in computer generated images, e.g., for lighting points on a character in a video game from frame-to-frame. In particular, embodiments of the invention provide a technique for computing the irradiance at a receiver point based on light emanating from a disk light source.

In one embodiment, a spherical harmonic (SH) representation of the irradiance function is built. The (SH) representation uses a two-dimensional (2D) lookup table to determine the correct set of SH coefficients needed generate a scalar value of irradiance at the receiver point. However, building the 2D lookup does not require the normal of the receiver point to be known as part of the pre-computation. Instead, the normal of the receiver point is used in conjunction with the SH coefficients at runtime to generate a scalar value of irradiance at the receiver point. Further, the 2D lookup table may easily be mapped to a texture, allowing it to be readily accessed using existing graphics hardware.

In one embodiment, the lookup table is stored in two textures, one used for receiver points within the radius (r) of the disk light source (a "near" texture) and one for more distant receiver points (a "far" texture). Each of these textures may be parameterized by:

(i) the cosine of the angle (θ) between the normal of the disk light source and a vector (D) from the center of the disk to the receiver point, and (ii) a function of a distance (d) between the receiver point and the center of the disk light source.

Specifically, the ratio of d/r is used for the first texture (i.e., for points where the distance d from the center of the disk light source is less than the radius r) and r/d is used for the second texture (i.e., for more distant points). Additionally, the radius r may be normalized to 1, both in the pre-computed textures and when the irradiance of a disk light source at a receiver point is evaluated dynamically, resulting effectively in a function of simply d for the near texture and 1/d for the far texture.

Further, a coordinate frame of reference is built using the normal of the disk light source as the Z axis, and using Z crossed with the vector D as the Y axis. In this coordinate frame, the irradiance function is an even function around the Y axis, which results in three of the spherical harmonic basis functions being identically zero. Thus, only six SH coefficients are stored for each texel in the near and far textures.

Figure 1B:
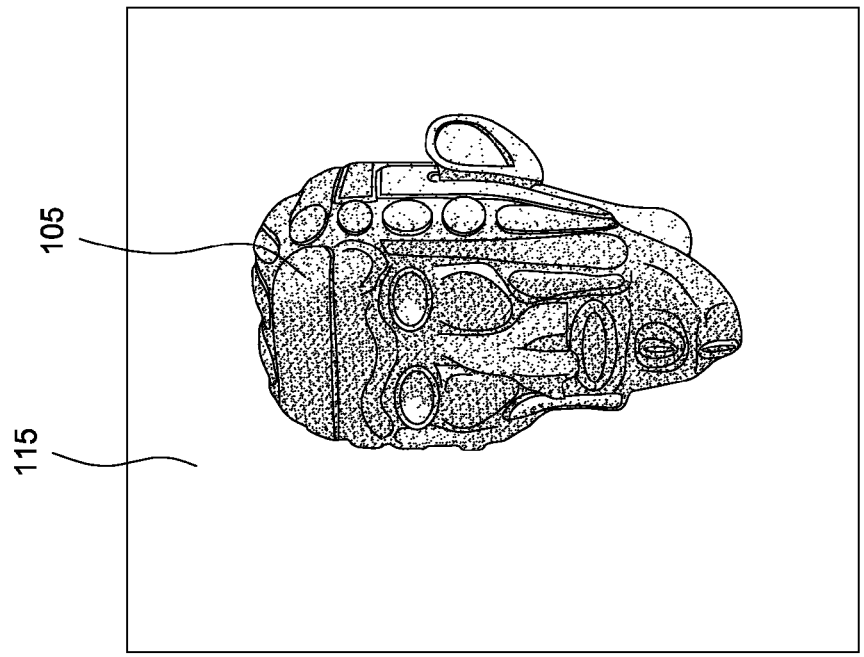
FIGS. 1A-1B show an example of a character lit using a disk light source.
Figure 1A:
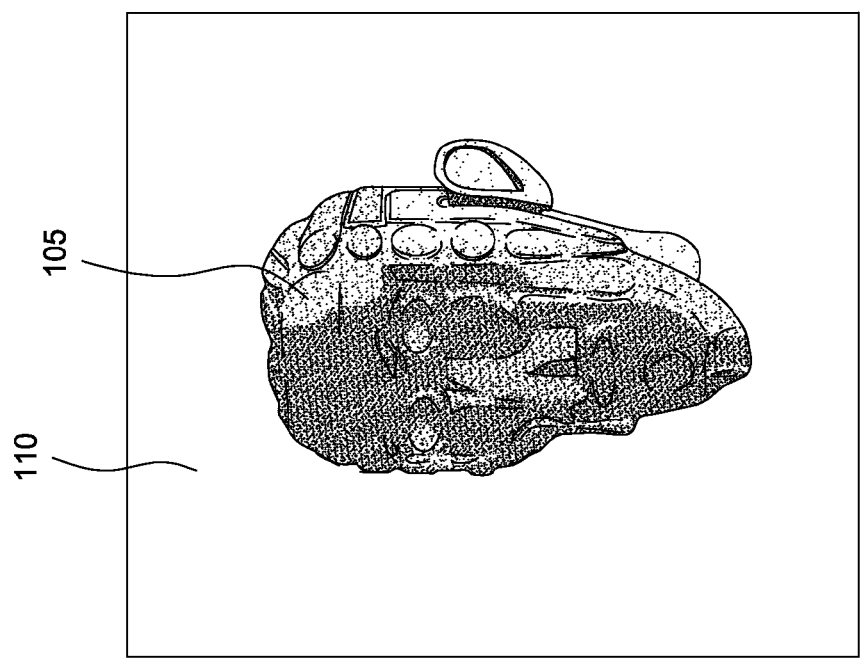

The results of this approach are shown in FIGS. 1A-1B, which provide an example comparing the lighting results obtained using the common approximation given above with the lighting results of the present invention. In this example, a disk light source twice the width of a character 105 is positioned to the right of the character 105. In panel 110 of FIG. 1A, the lighting for each point on the surface of the character 105 is computed using the common approximation:

$$\frac{\cos(\theta)\cos(\alpha)r^2}{r^2 + d^2}$$

However, the common approximation provides a poor lighting result; specifically, much of the surface of the character 105 is too dark and the irradiance of the character 105 falls off too quickly from right-to-left to appear realistic. This result occurs, in part, as using the common approximation results in no irradiance for points on the character 105 with a surface normal orthogonal to a vector pointing at the center of the disk light source (i.e., where the cosine of alpha is 0). In contrast, in panel 115 of FIG. 1B, the lighting irradiance of the character 105 is computed using the techniques described herein. As shown in panel 115, the lighting results computed for character 105 are much brighter and more uniform at the points on the right side of character 105 and exhibit a significantly more gradual tapering off across the surface of the character 105 from right-to-left.

System Overview

Figure 2:
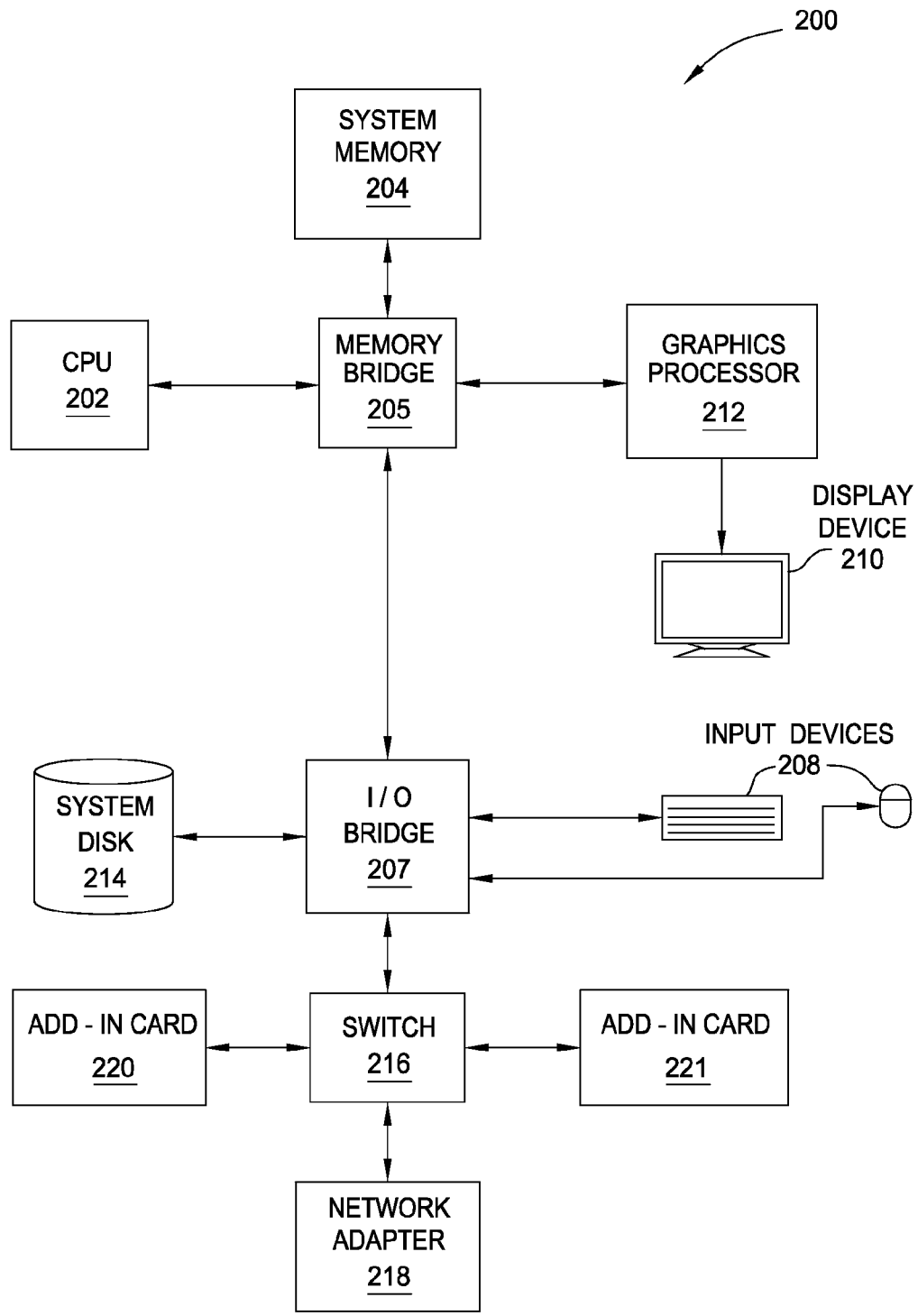
FIG. 2 is a block diagram of a system configured to implement one or more aspects of the present invention.

FIG. 2 is a block diagram of a system 200 configured to implement one or more aspects of the present invention. System 200 may be a computer workstation, personal computer, video game console, personal digital assistant, rendering engine, mobile phone, or any other device suitable for practicing one or more embodiments of the present invention.

As shown, system 200 includes a central processing unit (CPU) 202 and a system memory 204 communicating via a bus path that may include a memory bridge 205. CPU 202 includes one or more processing cores, and, in operation, CPU 202 is the master processor of system 200, controlling and coordinating operations of other system components. System memory 204 stores software applications and data for use by CPU 202. CPU 202 runs software applications and optionally an operating system. Memory bridge 205, which may be, e.g., a Northbridge chip, is connected via a bus or other communication path (e.g., a HyperTransport link) to an I/O (input/output) bridge 207. I/O bridge 207, which may be, e.g., a Southbridge chip, receives user input from one or more user input devices 208 (e.g., keyboard, mouse, joystick, digitizer tablets, touch pads, touch screens, still or video cameras, motion sensors, and/or microphones) and forwards the input to CPU 202 via memory bridge 205.

A graphics processor 212 is coupled to memory bridge 205 via a bus or other communication path (e.g., a PCI Express, Accelerated Graphics Port, or HyperTransport link); in one embodiment graphics processor 212 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Graphics processor 112 periodically delivers pixels to a display device 210 (e.g., a screen or conventional CRT, plasma, OLED, SED or LCD based monitor or television). Additionally, graphics processor 212 may output pixels to film recorders adapted to reproduce computer generated images on photographic film. Graphics processor 212 can provide display device 210 with an analog or digital signal.

A system disk 214 is also connected to I/O bridge 207 and may be configured to store content and applications and data for use by CPU 202 and graphics processor 212. System disk 214 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 216 provides connections between I/O bridge 207 and other components such as a network adapter 218 and various add-in cards 220 and 221. Network adapter 218 allows system 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 207. For example, an audio processor may be used to generate analog or digital audio output from instructions and/or data provided by CPU 202, system memory 204, or system disk 214. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, graphics processor 212 incorporates circuitry optimized for graphics and video processing, including, for example, video output circuitry, and constitutes a graphics processing unit (GPU). In another embodiment, graphics processor 212 incorporates circuitry optimized for general purpose processing. In yet another embodiment, graphics processor 212 may be integrated with one or more other system elements, such as the memory bridge 205, CPU 202, and I/O bridge 207 to form a system on chip (SoC). In still further embodiments, graphics processor 212 is omitted and software executed by CPU 202 performs the functions of graphics processor 212. Graphics processor 212 includes 3D rendering capabilities for generating pixel data for output images from instructions and data defining the geometry, lighting shading, texturing, motion, and/or camera parameters for a scene. Graphics processor 212 can further include one or more programmable execution units capable of executing shader programs, tone mapping programs, and the like.

In context of the present invention, the memory 204 of system 200 may store an application program configured to generate a "near" and "far" texture used to store SH coefficients for determining the irradiance from a disk light source at a receiver point. Further, once generated, the graphics memory may be used to store these textures, allowing them to be sampled by the GPU 212 to obtain the SH coefficients needed to compute the irradiance of a given receiver point while rendering an image of a given set of 3D graphics geometry.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies graphics processor 212 is connected to I/O bridge 207 or directly to CPU 202, rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Computing the Irradiance from a Disk Light Source at a Receiver Point

As noted above, embodiments of the invention provide techniques for efficiently determining the irradiance of elements of 3D scene geometry lit by a disk light source. In one embodiment, a spherical harmonic (SH) representation of the irradiance function is built for the disk light source and a two-dimensional (2D) lookup table is used to store the SH coefficients needed generate a scalar value of irradiance for any given receiver point. However, the normal of the receiver point is not required to pre-compute the lookup table. In particular, a first (or "near") texture and a second (or "far") texture are pre-computed. The near texture is sampled to determine the irradiance of a receiver point within the radius of the disk light source and the far texture is sampled to determine the irradiance of more distant points. The near and far textures may be 32×32 texels in size, where each texel stores a set of 6 SH coefficients. Additionally, the near and far textures may share one row of texels in common where the distance of the receiver point is equal to the radius of the disk light source. Doing so prevents interpolation artifacts being generated when computing the irradiance of a receiver point changes from using the near texture to the far texture, e.g., as a character in a video game moves away from (or closer towards) a given disk light source.

Figure 3:
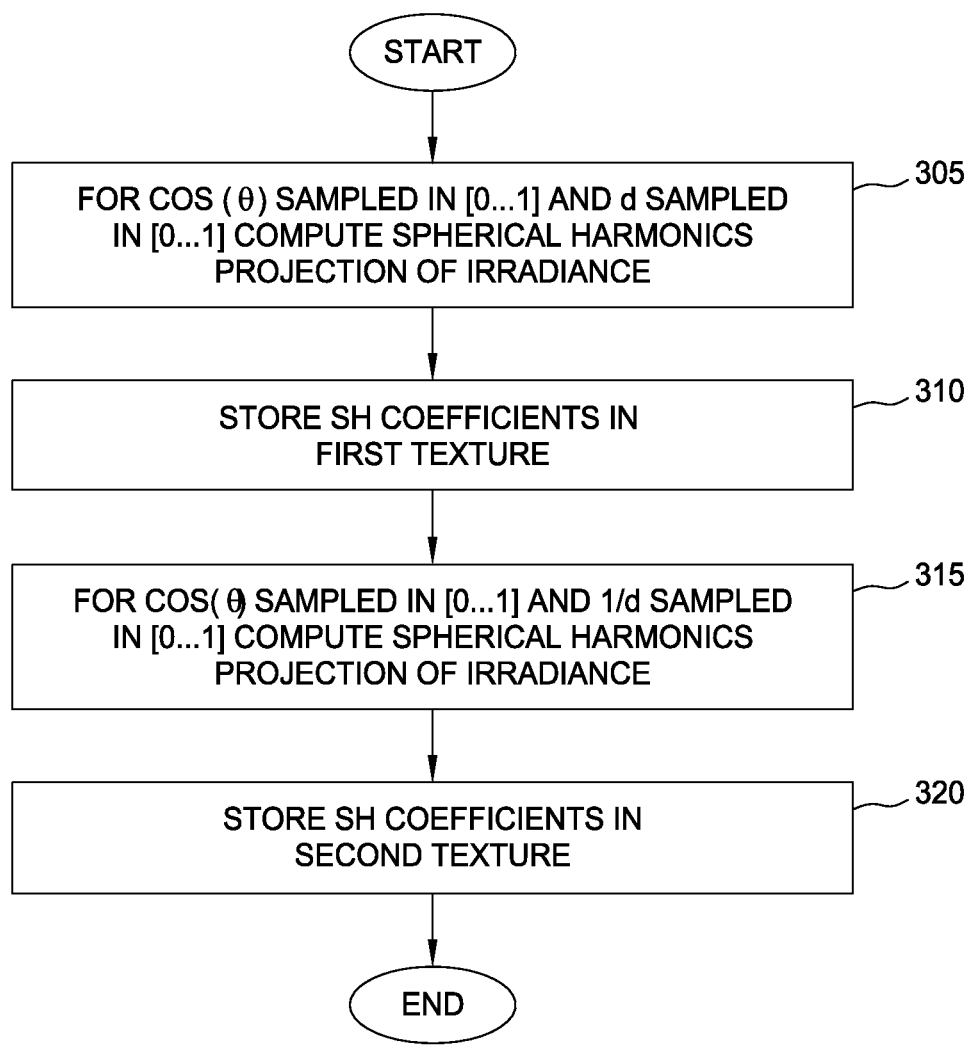
FIG. 3 illustrates a method for pre-computing a first and second texture used to compute the irradiance from a disk light source at a receiver point, according to one embodiment of the invention.

FIG. 3 illustrates a method for pre-computing a first texture and second texture used to compute the irradiance from a disk light source at a receiver point, according to one embodiment of the invention. As shown, the method 300 begins at step 305 where the first, or near, texture is pre-computed. In particular, the cosine of an angle (θ) between a normal of a disk light source with an assumed radius of 1 is sampled in a range of [0 . . . 1] (i.e., for a value of θ from 0° to 90°) for distances d also ranging from [0.1]. At each sampled receiver point, the spherical harmonics (SH) projection of irradiance is computed, using techniques known to one of skill in the art. For example, ray tracing approaches may be used to compute the projection of the radiance function into spherical harmonics and a convolution applied to the resulting radiance function to generate irradiance, tens of thousands of rays are done to make this highly accurate. Once computed, the SH coefficients are stored in a first texture (step 310) which may be used to determine the irradiance for any normal at a receiver point within a region bounded by a hemisphere around the disk light source. That is, the SH coefficients may be used to determine the irradiance for any point above the surface of the disk light source with a distance d to the center of the disk light source less than the radius r of that disk light source.

Figure 4:
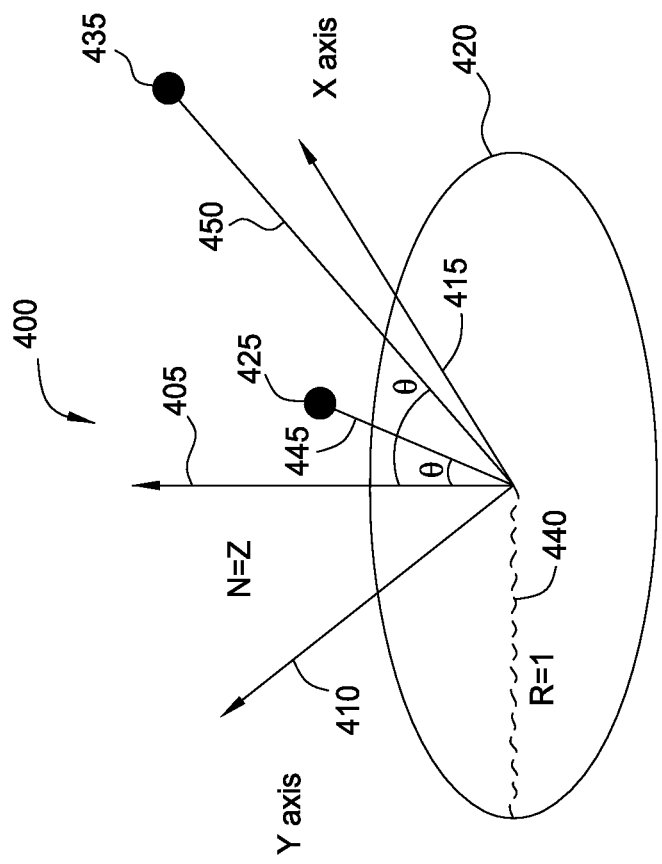
FIG. 4 is a normal view of a disk light source used to pre-compute first and second texture used to compute the irradiance from a disk light source at a receiver point, according to one embodiment of the invention.

Computing the spherical harmonics (SH) projection of irradiance results in nine SH coefficients being generated—three in each of an X, Y, and Z dimensions. However, in one embodiment, only six coefficients are stored in the texture generated at steps 305 and 310. In particular, the SH coefficients are computed using a coordinate frame built with the disk normal as the Z axis, and Z cross the vector from the point to the disk center as the Y axis. In this coordinate frame, the irradiance function is an even function around the Y axis, which means three of the spherical harmonic basis functions are identically zero. This result is shown in FIG. 4, which illustrates is a normal view 400 of a disk light source, according to one embodiment of the invention. As shown, a disk light source 420 has a radius 440 of 1. Additionally, the surface normal 405 of the disk light source 420 is aligned with the Z axis of a three-dimensional coordinate plain. The normal view 400 also shows the Y axis 410 and the X axis 415. A receiver point 425 is shown with a distance d 445 from the center of the disk light source (which also provides the origin of the X, Y, and Z coordinate frame. To compute the near texture, as ($\theta$) varies from 0° to 90°, the receiver point sweeps in an arc from the Z axis normal 405 of the disk light source 420 to the X axis 415. This process is repeated for values of d sampled from [0 . . . 1]. For example, for a 32×32 texture, integer values (i) in the range of [0 . . . 31] may be converted to a floating point value using the formula $(2i+1)/64$ In one embodiment, distance d may be parameterized as $(2i+1)/63$. Further, calculating distance as $(2i+1)/63$, the last texel (where i=31) is exactly one—this ensures that the function interpolates properly when switching from the near texture to the far texture. Additionally, the cosine may be parameterized to guarantee sampling at both the horizon (which will later be zero) and alignment with the normal. So the angle used for the $i^{th}$ texel (again from 0 to 31) is arcos(i/31). Note, using this coordinate frame, the Y coordinate value for each receiver point is 0 (regardless of the value of d or $\theta$).

Returning to the method 300 of FIG. 3, at step 315, the second, or far, texture is pre-computed. In particular, like the sampling performed for the near texture, the cosine of an angle ($\theta'$) between a normal of the disk light source having a radius of 1 is sampled in a range of [0 . . . 1] (i.e., for a value of $\theta'$ from 0° to 90°). However, in contrast to the values of d sampled for the near texture, the value of 1/d is sampled in a range from [0 . . . 1] to compute a spherical harmonics (SH) projection of irradiance for texels in the far texture. This result is shown in FIG. 4 for an example receiver point 435. As shown, the receiver point 435 is shown with a distance 450 greater than the radius r of the disk light source 420. The SH projection of irradiance is computed using the center of the disk light source as the origin of the X, Y, and Z coordinate frame, with Z collinear with the surface normal of the disk light source 420. To compute the far texture, as ($\theta'$) varies from 0° to 90°, the receiver point sweeps in an arc from the Z axis normal 405 of the disk light source 420 to the X axis 415. This process is repeated for values of 1/d sampled from [0 . . . 1].

The angular sampling is the same for both the near and far textures, which allows so that things interpolate properly. Accordingly, d in this case is always greater than 1, preventing any possible divide-by-zero errors. In one embodiment, the continuous texture coordinate may be determined using use is $1-(32-0.5)/32*1/d$. As a result, the first texel is evaluated exactly at d=1 (in order to be continuous with the near texture). Inverting this equation and solving for d as a function of integer texel index i, gives $d=63/(64-(2*i+1))$. Again, using a 32×32 texture indexed from [0,31], an index of i=0 gives 1.0 (as needed for correct for interpolation) and an index of i is 31 gives 63 (i.e., the largest distance d represented with the texture). And further, using this coordinate frame gives a Y coordinate value for each sampled receiver point is 0 (regardless of the value of 1/d or $\theta$).

Returning to the method 300 of FIG. 3, at step 320, the SH coefficients determined for the sampled values of $\theta'$ and 1/d may be stored in the second, or far texture. Once stored in the far texture, the SH coefficients may be used to determine the irradiance for any point above the surface of the disk light source with a distance d to the center of the disk light source greater than the radius r of that disk light source.

Figure 5:
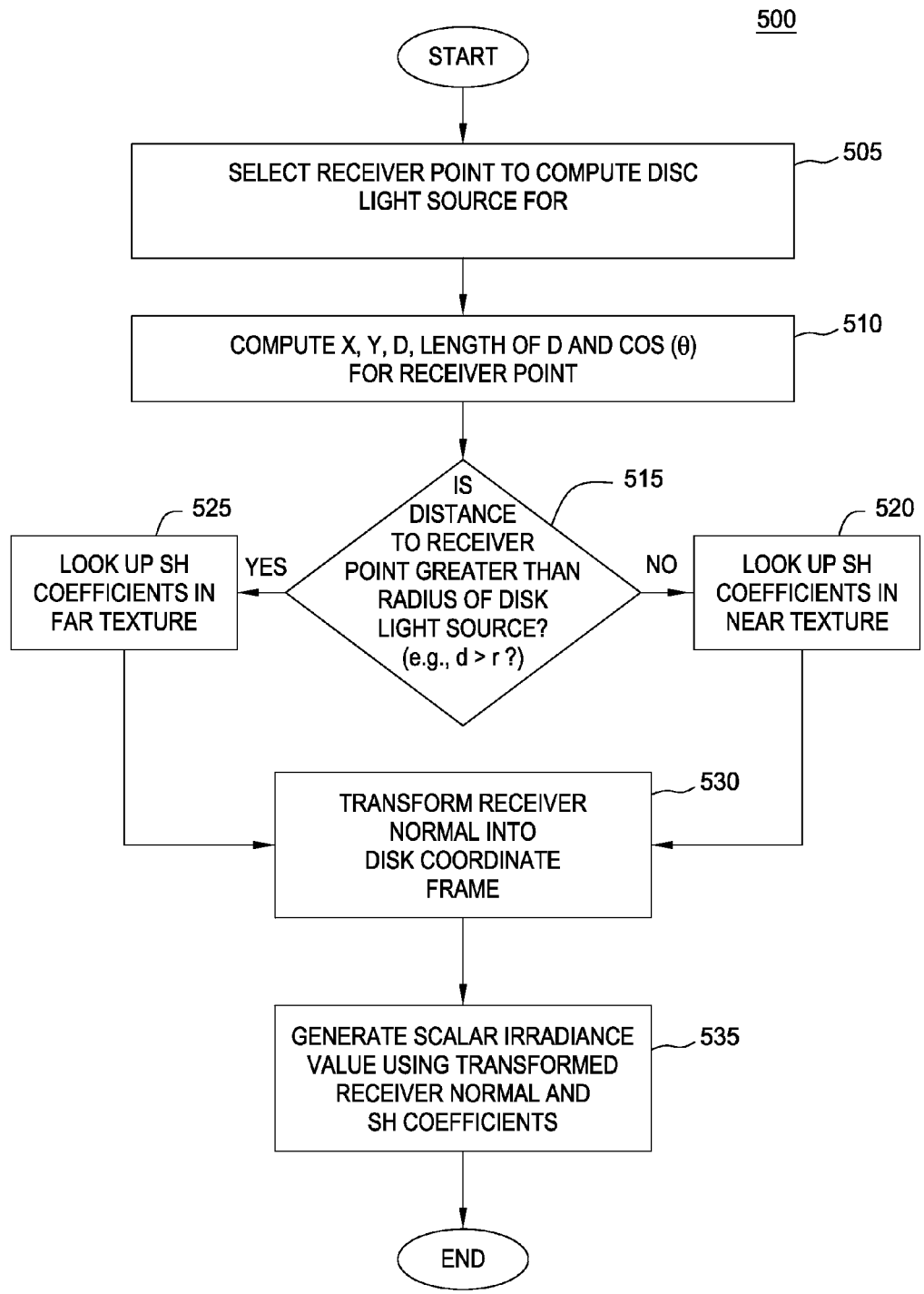
FIG. 5 illustrates a method to compute the irradiance from a disk light source at a receiver point, according to one embodiment of the invention.

FIG. 5 illustrates a method 500 for computing the irradiance from a disk light source at a receiver point, according to one embodiment of the invention. As shown, the method 500 begins at step 505, where a receiver point is selected. The receiver point may typically be a point on the surface of 3D geometry in a graphics scene being rendered, e.g., a point on the 3D geometry of a character in a video game.

Once the receiver point is selected, at step 510, vectors for X, Y, and D are determined and scalar values for d, and $\theta$ are determined. The vectors X and Y provide the axes of an X, Y, Z coordinate system. The Z axis is simply the surface normal of the disk light source. The X axis of the coordinate system is aligned such that the receiver point falls in the plane of the X axis. More generally, the position of the receiver point is translated into the coordinate frame used to generate the near and far textures, as was discussed above. Mathematically, assume D is a vector from a disk center to the receiver point and Z is the disk normal. In such a case, the position of the receiver point is translated as:

Y=cross (Z, D)
X=cross (Y, Z)

Y may be normalized after the cross product is computed, giving it a unit length. Doing so also ensures X will be of unit length as well. If Y is degenerate (i.e., a length close to zero) any frame may be chosen—since that means the receiver point projects to the center of the disk.

Figure 6:
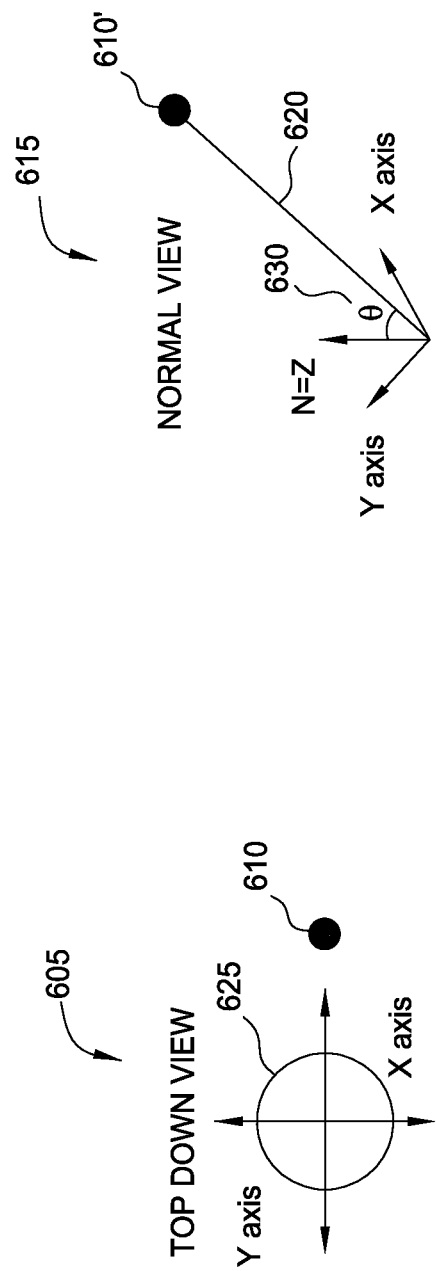
FIG. 6 illustrates an example of a receiver point for which the irradiance from a disk light source is computed, according to one embodiment of the invention.

FIG. 6 illustrates an example of a receiver point 610 in both a top-down view 605 and normal view 615. As shown in the top-down view 605, the receiver point 610 is aligned with the X axis, with the origin of the coordinate system at the center of the disk light source 625. In this coordinate system, the reviver point 610 has a y-coordinate value of 0. Additionally, the normal view 615 shows the vector D 620 for the receiver point 610' along with the angle $\theta$ between the normal of the disk light source (i.e., the Z axis) and the vector D 620. In this coordinate frame, the distance d is simply the magnitude of the vector D 620. Note, the size of the disk radius may be normalized using the following formula:

$$D=(P-C)/r$$

where P is receiver point, C is disk center and r is disk radius.

Returning to the method 500 of FIG. 5, at step 515, if the distance d (from the center of the disk light source to the receiver point) is greater than the radius of the disk light source, than at step 525, the six SH coefficients are retrieved from the far texture using the cosine of $\theta$ and d/r as lookup parameters. Otherwise, if the distance d is less than the radius of the disk light source, than at step 520, the six SH coefficients are retrieved from the far texture using the cosine of $\theta$ and r/d as parameters to the far texture. At step 530, the normal of the receiver point is transformed into the disk coordinate frame. That is, the coordinate position of the receiver is translated into the X, Y, and Z coordinate frame having an origin centered on the disk light source. At step 535, the SH coefficients retrieved from either the near or far texture and the transformed receiver normal are evaluated using the spherical harmonics function to generate a scalar irradiance value at the receiver point.

In sum, embodiments of the invention provide a technique to directly determine the irradiance from a disk light source with much higher accuracy than may be obtained using the common approximation used currently. By pre-computing, SH coefficients using a specific coordinate frame, only six SH coefficients need to be stored in a first and second texture, one used to determine irradiance of a point within the radius of a disk light source and another for more distant points. Advantageously, this approach does not need to use the normal of the receiver to perform the pre-computation. Instead, the normal of the receiver point is used in conjunction with the SH coefficients at runtime to generate a scalar value of irradiance at the receiver point.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating pre-computed lighting data used to compute a lighting irradiance from a disk light source at a receiver point, the method comprising:
generating, by operation of one or more computer processors, a first table for a plurality of points within a radius of the disk light source, wherein one or more entries in the first table stores a first set of spherical harmonics (SH) coefficients;
generating, by operation of the one or more computer processors, a second table for a plurality of points outside of the radius of the disk light source, wherein one or more entries in the second table stores a second set of SH coefficients;
storing the first table in a first texture parameterized by (i) a cosine of an angle ($\theta$) measured between a normal of the disk light source and by a vector (D) from the center of the disk light source to a given one of the first plurality of points and (ii) a distance d measured from the center of the disk light source to the given one of the first plurality of points; and
storing the second table in a second texture parameterized by (i) a cosine of an angle ($\theta$) measured between the normal of the disk light source and by a vector (D) from the center of the disk light source to a given one of the second plurality of points and (ii) a ratio of 1 to a distance d (1/d) measured from the center of the disk light source to the given of the second plurality of points.

2. The method of claim 1, wherein the first plurality of points and second plurality of points are defined using a coordinate frame of reference built using the normal of the disk light source as a Z axis and using Z crossed with the vector D as the Y axis, and wherein the center of the disk light source provides an origin for the coordinate frame of reference.

3. The method of claim 2, wherein each texel in the first texture stores six spherical harmonics (SH) coefficients and wherein each texel in the second texture stores six SH coefficients.

4. The method of claim 2, further comprising:
receiving an indication of a location of the receiver point;
upon determining a distance from the receiver point to the center of the disk light source is less than the radius of the disk light source, sampling the first texture to retrieve a corresponding set of SH coefficients;
translating a normal at the receiver point into the coordinate frame of reference; and
computing the lighting irradiance at the receiver point from the corresponding set of SH coefficients and the translated normal.

5. The method of claim 2, further comprising:
receiving an indication of a location of the receiver point;
upon determining a distance from the receiver point to the center of the disk light source is greater than the radius of the disk light source, sampling the second texture to retrieve a corresponding set of SH coefficients;
translating a normal at the receiver point into the coordinate frame of reference; and
computing the lighting irradiance at the receiver point from the corresponding set of SH coefficients and the translated normal.

6. A non-transitory computer-readable storage medium storing instructions that, when executed by a processor, cause a computer system to perform an operation for generating pre-computed lighting data used to compute a lighting irradiance from a disk light source at a receiver point, the operation comprising:
generating a first table for a plurality of points within a radius of the disk light source, wherein one or more entries in the first table stores a set of spherical harmonics (SH) coefficients;
generating a second table for a plurality of points outside of the radius of the disk light source, wherein one or more entries in the second table stores a set of SH coefficients;
storing the first table in a texture parameterized by (i) a cosine of an angle ($\theta$) measured between a normal of the disk light source and by a vector (D) from a center of the disk light source to a given one of the first plurality of points and (ii) a distance d measured from the center of the disk light source to the given one of the first plurality of points; and
storing the second table in a texture parameterized by (i) a cosine of an angle ($\theta$) measured between the normal of the disk light source and by a vector (D) from the center of the disk light source to a given one of the second plurality of points and (ii) a ratio of 1 to a distance d (1/d) measured from the center of the disk light source to the given of the second plurality of points.

7. The computer-readable storage medium of claim 6, wherein the first plurality of points and second plurality of points are defined using a coordinate frame of reference built using the normal of the disk light source as a Z axis and using Z crossed with the vector D as the Y axis, and wherein the center of the disk light source provides an origin for the coordinate frame of reference.

8. The computer-readable storage medium of claim 7, wherein each texel in the first texture stores six spherical harmonics (SH) coefficients and wherein each texel in the second texture stores six SH coefficients.

9. The computer-readable storage medium of claim 7, wherein the operation further comprises:
receiving an indication of a location of the receiver point;
upon determining a distance from the receiver point to the center of the disk light source is less than the radius of the disk light source, sampling the first texture to retrieve a corresponding set of SH coefficients;
translating a normal at the receiver point into the coordinate frame of reference; and
computing the lighting irradiance at the receiver point from the corresponding set of SH coefficients and the translated normal.

10. The computer-readable storage medium of claim 7, wherein the operation further comprises:
receiving an indication of a location of the receiver point;
upon determining a distance from the receiver point to the center of the disk light source is greater than the radius of the disk light source, sampling the second texture to retrieve a corresponding set of SH coefficients;
translating a normal at the receiver point into the coordinate frame of reference; and
computing the lighting irradiance at the receiver point from the corresponding set of SH coefficients and the translated normal.

11. A system, comprising:
a processor; and
a memory configured to perform an operation for generating pre-computed lighting data used to compute a lighting irradiance from a disk light source at a receiver point, the operation comprising:
generating a first table for a plurality of points within a radius of the disk light source, wherein one or more entries in the first table stores a set of spherical harmonics (SH) coefficients,
generating a second table for a plurality of points outside of the radius of the disk light source, wherein one or more entries in the second table stores a set of SH coefficients;
storing the first table in a second texture parameterized by (i) a cosine of an angle (θ) measured between a normal of the disk light source and by a vector (D) from a center of the disk light source to a given one of the first plurality of points and (ii) a distance d measured from the center of the disk light source to the given one of the first plurality of points; and
storing the second table in a second texture parameterized by (i) a cosine of an angle (θ) measured between the normal of the disk light source and by a vector (D) from the center of the disk light source to a given one of the second plurality of points and (ii) a ratio of 1 to a distance d (1/d) measured from the center of the disk light source to the given of the second plurality of points.

12. The system of claim 11, wherein the first plurality of points and second plurality of points are defined using a coordinate frame of reference built using the normal of the disk light source as a Z axis and using Z crossed with the vector D as the Y axis, and wherein the center of the disk light source provides an origin for the coordinate frame of reference.

13. The system of claim 12, wherein each texel in the first texture stores six spherical harmonics (SH) coefficients and wherein each texel in the second texture stores six SH coefficients.

14. The system of claim 12, wherein the operation further comprises:
receiving an indication of a location of the receiver point;
upon determining a distance from the receiver point to the center of the disk light source is less than the radius of the disk light source, sampling the first texture to retrieve a corresponding set of SH coefficients;
translating a normal at the receiver point into the coordinate frame of reference; and
computing the lighting irradiance at the receiver point from the corresponding set of SH coefficients and the translated normal.

15. The system of claim 12, wherein the operation further comprises:
receiving an indication of a location of the receiver point;
upon determining a distance from the receiver point to the center of the disk light source is greater than the radius of the disk light source, sampling the second texture to retrieve a corresponding set of SH coefficients;
translating a normal at the receiver point into the coordinate frame of reference; and
computing the lighting irradiance at the receiver point from the corresponding set of SH coefficients and the translated normal.

16. A method for determining a lighting irradiance from a disk light source at a receiver point, the method comprising:
receiving an indication of a location of the receiver point;
determining a distance (d) from the receiver point to a center of the disk light source; and
by operation of one or more computer processors:
upon determining the distance d is less than a radius (r) of the disk light source, sampling a first texture to retrieve a first set of SH coefficients, wherein each texel in the first texture stores a set of spherical harmonics (SH) coefficients for one of a first plurality of points located within the radius of the disk light source, wherein the first texture is parameterized by (i) a cosine of an angle (θ) measured between a normal of the disk light source and by a vector (D) from the center of the disk light source to a given one of the first plurality of points and (ii) a distance d measured from the center of the disk light source to the given one of the first plurality of points, and
upon determining the distance d is greater than the radius (r) of the disk light source, sampling a second texture to retrieve a corresponding set of SH coefficients, wherein each texel in the second texture stores a set of spherical harmonics (SH) coefficients corresponding to one of a plurality of points located outside of the radius of the disk light source, wherein the second texture is parameterized by (i) a cosine of an angle (θ) measured between the normal of the disk light source and by a vector (D) from the center of the disk light source to a given one of the second plurality of points and (ii) a ratio of 1 to a distance d (1/d) measured from the center of the disk light source to the given of the second plurality of points;
translating a normal at the receiver point into the coordinate frame of reference; and
computing the lighting irradiance at the receiver point from the sampled set of SH coefficients and the translated normal.

17. The method of claim 16, wherein the first plurality of points and second plurality of points are defined using a coordinate frame of reference built using the normal of the disk light source as a Z axis and using Z crossed with the vector D as the Y axis, and wherein the center of the disk light source provides an origin for the coordinate frame of reference.

18. The method of claim 16, wherein each texel in the first texture stores six spherical harmonics (SH) coefficients and wherein each texel in the second texture stores six SH coefficients.

* * * * *

UNITED STATES PATENT AND TRADEMARK OFFICE
CERTIFICATE OF CORRECTION

PATENT NO. : 8,462,157 B2  
APPLICATION NO. : 12/756842  
DATED : June 11, 2013  
INVENTOR(S) : Sloan Page 1 of 1

It is certified that error appears in the above-identified patent and that said Letters Patent is hereby corrected as shown below:

In the Specification:

Column 3, Line 56, please delete "rid" and insert --r/d-- therefor.

Signed and Sealed this
Seventeenth Day of September, 2013

Teresa Stanek Rea
*Deputy Director of the United States Patent and Trademark Office*